United States Patent
Schnorbus et al.

(10) Patent No.: US 9,885,301 B2
(45) Date of Patent: Feb. 6, 2018

(54) METHOD FOR ADJUSTING THE AIR-FUEL RATIO IN THE EXHAUST GAS OF A DIRECT INJECTION INTERNAL COMBUSTION ENGINE FOR NOX STORAGE CATALYTIC CONVERTER REGENERATION

(71) Applicant: FEV GMBH, Aachen (DE)

(72) Inventors: Thorsten Schnorbus, Aachen (DE); Joschka Schaub, Aachen (DE)

(73) Assignee: FEV GmbH, Aachen (DE)

( * ) Notice: Subject to any disclaimer, the term of this patent is extended or adjusted under 35 U.S.C. 154(b) by 169 days.

(21) Appl. No.: 15/061,080

(22) Filed: Mar. 4, 2016

(65) Prior Publication Data
US 2016/0258372 A1 Sep. 8, 2016

(30) Foreign Application Priority Data
Mar. 6, 2015 (DE) .......................... 10 2015 204 102

(51) Int. Cl.
*F01N 3/00* (2006.01)
*F01N 3/02* (2006.01)
(Continued)

(52) U.S. Cl.
CPC ....... *F02D 41/0275* (2013.01); *F01N 3/0814* (2013.01); *F01N 3/0885* (2013.01); *F02D 35/023* (2013.01); *F02D 35/026* (2013.01); *F02D 35/028* (2013.01); *F02D 41/0245* (2013.01); *F02D 41/1401* (2013.01); *F02D 41/1456* (2013.01); *F02D 41/405* (2013.01); *F02D 2041/1412* (2013.01); *F02D 2041/1418* (2013.01); *Y02T 10/26* (2013.01); *Y02T 10/44* (2013.01)

(58) Field of Classification Search
CPC .... F01N 3/0814; F01N 3/0885; F02D 35/023; F02D 35/026; F02D 35/028; F02D 41/0245; F02D 41/0275; F02D 41/1401; F02D 41/1456; F02D 41/405; Y02T 10/26; Y02T 10/44
USPC .......................................... 60/295
See application file for complete search history.

(56) References Cited

U.S. PATENT DOCUMENTS

| | | | | |
|---|---|---|---|---|
| 8,161,730 B2 * | 4/2012 | Chi | .................... | B01D 53/9409 60/286 |
| 2006/0107653 A1 * | 5/2006 | Nakatani | ............... | F01N 3/0842 60/286 |
| 2009/0277159 A1 * | 11/2009 | Driscoll | ............. | B01D 53/9409 60/286 |

FOREIGN PATENT DOCUMENTS

| | | |
|---|---|---|
| DE | 102006015503 A1 | 10/2007 |
| DE | 102006020675 A1 | 11/2007 |

(Continued)

*Primary Examiner* — Mark Laurenzi
*Assistant Examiner* — Dapinder Singh
(74) *Attorney, Agent, or Firm* — Dinsmore & Shohl LLP

(57) ABSTRACT

Method for adjusting the air-fuel ratio in the exhaust gas of a direct injection internal combustion engine, wherein the combusting fuel injection is divided into a plurality of individual injections, and wherein the air-fuel ratio in the exhaust gas of the internal combustion engine for a given load (PMI) is predictively adjusted by at least one model, by adjusting the position of the centroid of heat release conversion rates and the injection amount of the total combusting fuel injection, to a value that is necessary for the regeneration of an NOx storage catalytic converter in the exhaust system of the internal combustion engine.

16 Claims, 2 Drawing Sheets

(51) Int. Cl.
*F01N 3/10* (2006.01)
*F01N 3/20* (2006.01)
*F02D 41/02* (2006.01)
*F01N 3/08* (2006.01)
*F02D 41/14* (2006.01)
*F02D 41/40* (2006.01)
*F02D 35/02* (2006.01)

(56) References Cited

FOREIGN PATENT DOCUMENTS

| | | |
|---|---|---|
| DE | 102011055273 A1 | 5/2013 |
| DE | 102011055275 A1 | 5/2013 |
| WO | 2009112056 A1 | 9/2009 |

\* cited by examiner

METHOD FOR ADJUSTING THE AIR-FUEL RATIO IN THE EXHAUST GAS OF A DIRECT INJECTION INTERNAL COMBUSTION ENGINE FOR NOX STORAGE CATALYTIC CONVERTER REGENERATION

CROSS-REFERENCE TO RELATED APPLICATIONS

This application claims priority of German Patent Application No. 10 2015 204 102.6 filed Mar. 6, 2015.

TECHNICAL FIELD

The present specification concerns a method for adjusting the air-fuel ratio in the exhaust gas of a direct injection internal combustion engine for NOx storage catalytic converter regeneration.

BACKGROUND

The air-fuel ratio in the exhaust gas of a direct injection internal combustion engine with an NOx storage catalytic converter in the exhaust system is of special importance for regeneration of the NOx storage catalytic converter. Modern lean burn engines operate with an excess of oxygen. In order to also be able to meet future exhaust standards despite the resulting oxides of nitrogen (NOx), NOx storage catalytic converters are used. In NOx storage catalytic converters, oxides of nitrogen can be temporarily stored in the (hyperstoichiometric) lean burn mode. The catalytic reduction thereof only succeeds in a rich (substoichiometric) exhaust gas mixture. If the absorption capacity of the NOx storage catalytic converter is exhausted, a rich (hyperstoichiometric) reducing exhaust gas mixture is set by the engine electronics. In the rich cycle the oxides of nitrogen temporarily stored in the NOx storage catalytic converter are reduced to nitrogen and hence the catalytic converter is prepared for the next storage cycle.

With conventional methods, the air-fuel ratio in the exhaust system is determined by a lambda probe in the exhaust system and is regulated by a regulator that varies the position of the centroid of heat release conversion rates and the injection amount of the total combusting fuel injection.

DE 10 2011 055 273 A1 and DE 10 2011 055 275 A1, which are incorporated herein by reference, describe methods for controlling and regulating the exhaust gas temperature of a direct injection internal combustion engine using a model. Here the optimum injection amount for a plurality of injections is determined predictively in order to be able to set the optimum temperature for the regeneration of a diesel particle filter.

DE 10 2006 015 503 A1, which is incorporated herein by reference, describes methods for regulating the injection process of a direct injection internal combustion engine, wherein the regulation causes a change of the injection profile at least during a first working cycle based on at least one parameter recorded during the first working cycle. A combustion regulator is provided that regulates the start of injection and the injection characteristic based on the centroid of combustion. The position of the centroid of combustion is generally recorded after the conversion of 50% of the injected fuel amount, even if this is not exact in relation to the integrated area of the conversion rate. Combustion chamber pressure sensors are used to determine the position of the centroid of combustion, using which the conversion rate can be determined from the combustion chamber pressure.

The temperature of the exhaust gas emanating from a direct injection internal combustion engine corresponds to the temperature after the exhaust valve or, if a turbocharger of the internal combustion engine is directly connected downstream, the temperature upstream of the turbine of the turbocharger. The temperature is usually regulated by an already known regulating method. However, with any regulating method delays to the regulation of the regulated variable occur because the same has to be initially determined or measured in order to be fed back again in the regulator's feedback loop. In order to counter the problem, WO 2009/112056 A1 proposes a temperature model of a gas in a combustion chamber of a cylinder in order to predictively determine the temperature of an exhaust gas emanating from the combustion chamber of the cylinder and to feed the same to a regulator. With the internal combustion engine described therein, an HC emission model is also provided in order to determine the HC emissions of an exhaust gas emanating from the combustion chamber. The same is used to regulate the regeneration of an exhaust cleaning system, in particular a particle filter.

SUMMARY

The object of the present specification is to provide a method for adjusting the air-fuel ratio in the exhaust gas of a direct injection internal combustion engine that enables improved NOx storage catalytic converter regeneration.

The object is achieved by a method for adjusting the air-fuel ratio in the exhaust gas of a direct injection internal combustion engine as described herein. In the method, the combusting fuel injection is divided into a plurality of individual injections and the air-fuel ratio in the exhaust gas of the internal combustion engine for a given load is predictively adjusted by at least one model to a value that is necessary for the regeneration a NOx storage catalytic converter in the exhaust system of the internal combustion engine by adjusting the position of the centroid of heat release conversion rates and the injection amount of the total combusting fuel injection.

Owing to the predictive pilot control of the air-fuel ratios in the exhaust gas of the internal combustion engine, the method responds faster than conventional methods that only use a regulator. As a result, for example torque changes resulting from regulation deviations in the air path can be compensated by a rapid injection path, whereby driving behaviour in the regeneration mode is improved. Further, a more robust method is achieved under variable ambient and operating conditions, which reduces the number of aborted rich operating cycles for regeneration and thus has a positive effect on fuel consumption.

In contrast to many previous methods of temperature regulation or control, the position of the centroid of the conversion rate area is used and not the position of the conversion of 50% of the injected fuel, which already gives higher accuracy. The reason for this, inter alia, is that when there is a plurality of injections, by displacing the position of one of the injections the position of the conversion of 50% of the fuel can sometimes change suddenly. Further, when there is a plurality of injections, by shifting the position of one of the injections the position of the conversion of 50% of the fuel may sometimes not change, for example if it lies exactly between the individual injections, wherein however the centroid of conversion rates is significantly shifted in relation to all injections.

Moreover, the centroid of conversion rates is already regulated in the control loop. The regulation variable is therefore already the centroid of conversion rates, whereby regulation with a faster response can be implemented.

The injection amount of the total combusting fuel injection as well as the number, the start and the end of the individual injections are adjusted to adjust the position of the centroid of heat release conversion rates.

The combusting fuel injection is preferably divided into a main injection and a post-injection.

The injection amount of the total combusting fuel injection is calculated based on a target value of the air-fuel ratio in the exhaust gas and a determined amount of oxygen in the induction air of the internal combustion engine.

Further, the position of the centroid of heat release conversion rates is determined based on a target value for the indicated average pressure and the injection amount of the total combusting fuel injection using a model.

A required injection amount of the total combusting fuel injection results for a predetermined target value of the air-fuel ratio in the exhaust gas of the internal combustion engine that corresponds to a value that is required for regeneration of a NOx storage catalytic converter. Further, a required indicated average pressure results for a defined load on the internal combustion engine. When setting said two variables, a certain position of the centroid of heat release conversion rates results. If the number of combusted injections and the start and end of the individual injections are then predetermined, exactly one injection quantity results for each individual injection.

A required difference is preferably determined from a predetermined target value of the indicted average pressure and a measured value of the indicated average pressure, and a correction value for the position of the centroid of heat release conversion rates is determined therefrom by a higher level regulator.

A corrected target value for the centroid of heat release conversion rates is determined from the correction value for the position of the centroid of heat release conversion rates and a target value of the centroid of heat release conversion rates.

Further, a difference value for the centroid of heat release conversion rates is determined from the corrected target value for the centroid of heat release conversion rates and an actual value for the centroid of heat release conversion rates and the position of the individual injections and/or the distribution of the injection amounts of the entire injection amount to the individual injections is regulated by a regulator based on the difference value.

The target value of the centroid of heat release conversion rates can hereby be determined based on a characteristic field.

The actual value of the centroid of heat release conversion rates is preferably determined by a combustion model or from measured pressure profiles of the combustion chamber pressure. The use of a model has the advantage that the actual value can be determined predictively.

Further, a required difference is determined from a target value of the air-fuel ratio in the exhaust gas and an actual value of the air-fuel ratio, and the total injection amount is regulated therewith by a higher level regulator.

A model for calculating the energy conversion and the combustion profile can be used to adjust the position of the centroid of heat release conversion rates and the injection amount of the total combusting fuel injection.

The positions of the individual predictively determined injections can be adjusted by a higher level combustion position regulator.

Here combustion pressure sensors are provided, by which the combustion chamber pressure for regulating the combustion position is measured.

The object is further achieved by a direct injection internal combustion engine with an exhaust system and a NOx storage catalytic converter disposed therein as well as an electronic control unit configured to adjust the air-fuel ratio in the exhaust gas emanating from the internal combustion engine according to the method described above.

At least one combustion chamber pressure sensor can be provided here for combustion position regulation.

BRIEF DESCRIPTION OF THE DRAWINGS

Further advantages, features and details of the present specification can be found in the following description in which exemplary embodiments of the present specification are described in detail with reference to the drawings. In the drawings, in each case in a schematic form.

DETAILED DESCRIPTION

Figure 1:
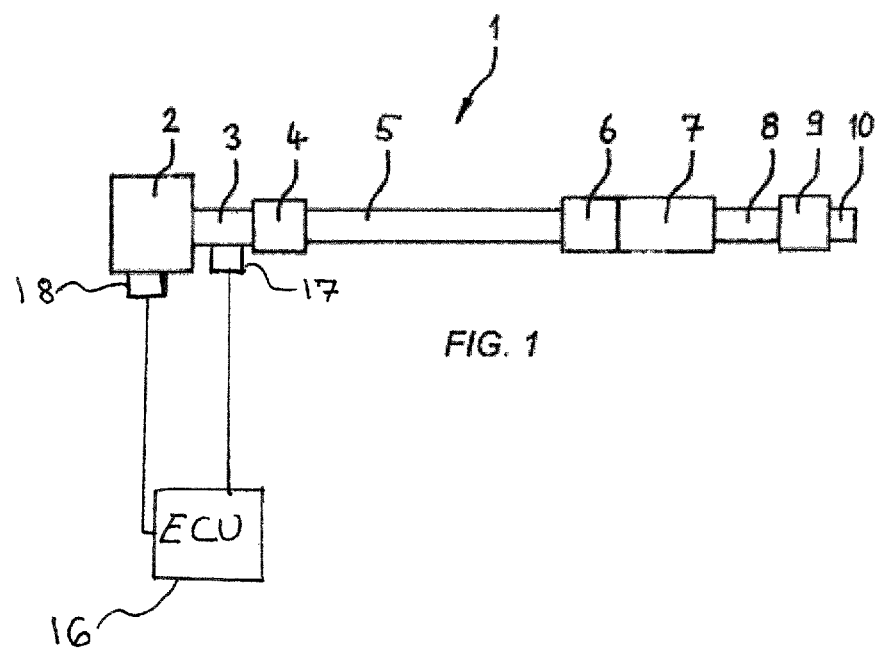
FIG. 1 shows a schematic representation of an internal combustion engine with an exhaust system.

FIG. 1 shows schematically the design of a diesel internal combustion engine 2 with an exhaust system 1. The diesel internal combustion engine 2 is connected to a first exhaust pipe 3 leading to a turbine 4 of a turbocharger. The first exhaust pipe 3 can contain one or a plurality of exhaust manifolds, in which the exhaust gas flows of different combustion chambers or cylinders of the diesel internal combustion engine 2 are combined. In addition, further components can be provided here, such as AGR valves and branches for example.

The turbine 4 is connected to an exhaust retreatment device by a second exhaust pipe 5. The exhaust retreatment device includes an oxidation catalytic converter 6 and a particle filter 7. A third exhaust pipe 8 is connected thereto and leads to a NOx storage catalytic converter 9 that opens into a fourth exhaust pipe 10 as an end piece. Further components can be provided in the individual exhaust pipes 3, 5, 8, 10.

The air-fuel ratio in the exhaust gas of the diesel internal combustion engine 2 is particularly important for the regeneration of the NOx storage catalytic converter 9. If the absorption capacity of the NOx storage catalytic converter 9 is exhausted, a rich, reducing exhaust gas mixture is briefly set by an electronic control unit (ECU) 16 that are not shown here. In the rich cycle, the oxides of nitrogen temporarily stored in the NOx storage catalytic converter 9 are reduced to nitrogen and the NOx storage catalytic converter 9 is regenerated and thereby prepared for the next storage cycle.

Figure 2:
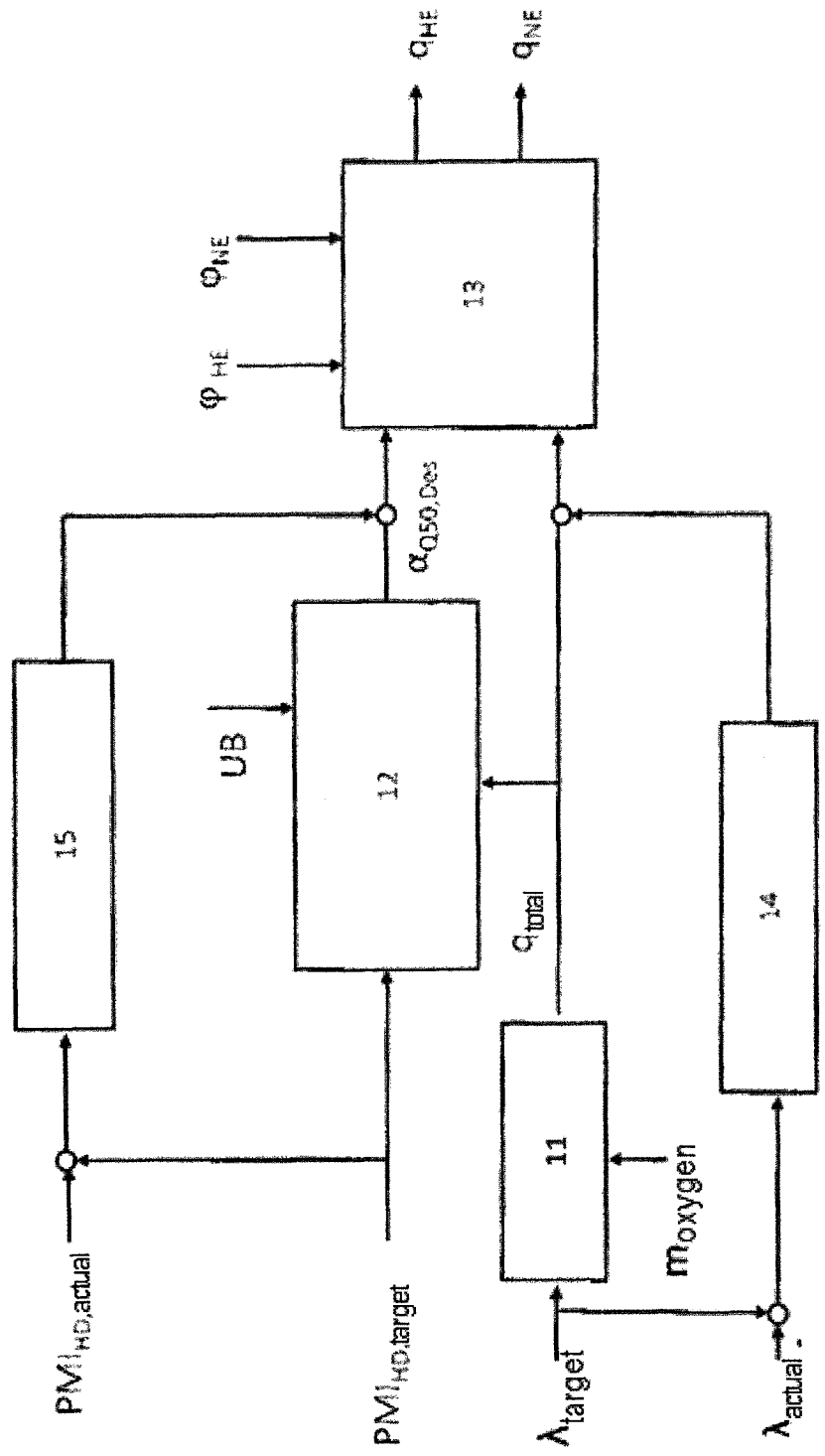
FIG. 2 shows a schematic representation of a process flow.

It is necessary for this purpose to adjust the air-fuel ratio $\lambda_{actual}$ in the exhaust gas of the diesel internal combustion engine 2 such that the oxides of nitrogen temporarily stored in the NOx storage catalytic converter 9 can be reduced to nitrogen. This is carried out according to the process flow shown in FIG. 2, executed by the ECU 16, using a target value for the air-fuel ratio $\lambda_{target}$ and the amount of oxygen $m_{oxygen}$ in the induction air of the diesel internal combustion engine 2.

In step 11 of the process, initially the injection amount $q_{total}$ total of the total combusting fuel injection is determined in order to adjust the air-fuel ratio $\lambda_{actual}$.

In step 12 of the process, a target value of the indicated average pressure $PMI_{HD, target}$ for the demanded load based on the ambient conditions UB is necessary, and the determined injection amount $q_{total}$ of the total combusting fuel injection determines the position of the centroid of heat release conversion rates $\alpha_{Q50, Des}$. For this purpose, in step 12 of the process an energy conversion and the combustion profile model can be used for the calculation of the energy conversion and the combustion profile. The energy conversion and the combustion profile model is stored in memory of the ECU 16 and executed by the ECU 16.

The division of the injection amount $q_{total}$ of the total combusting fuel injection among the individual injections in individual injection amounts $q_{HE}$, $q_{NE}$ is carried out in step 13 of the process from the position of the centroid of heat release conversion rates $\alpha_{Q50, Des}$ and predefined values for the number, the start $\varphi_{HE}$, $\varphi_{NE}$ and end of the individual injections.

In order to enhance the response times of the system, regulators 14,15 can be placed in control of process step 11 for determining the injection amount $q_{total}$ of the total combusting fuel injection and/or process step 12 for determining the position of the centroid of heat release conversion rates $\alpha_{Q50, Des}$.

Thus for example a regulator 14 is provided for determining the injection amount $q_{total}$ of the total combusting fuel injection. Initially the actual air-fuel ratio $\lambda_{actual}$ in the exhaust gas of the diesel internal combustion engine 2 is determined by an air-fuel ratio sensor 17 in the exhaust gas system 1. The ECU 16 is configured to calculate a difference value is from this and from the target value for the air-fuel ratio $\lambda_{actual}$ and is fed to the regulator 14. The regulator 14 then determines a difference value for the injection amount $q_{total}$ of the total combusting fuel injection which, together with the injection amount $q_{total}$ of the total combusting fuel injection determined in process step 11, is fed to process step 12 for determining the position of the centroid of heat release conversion rates and to process step 13 for determining the injection amounts $q_{HE}$, $q_{NE}$ of the individual fuel injections.

Further, a higher level regulator 15 is likewise provided for determining the position of the centroid of heat release conversion rates $\alpha_{Q50, Des}$. The actual indicated average pressure $PMI_{HD, actual}$ is initially determined by means of a combustion chamber pressure sensor 18 in at least one of the cylinders of the diesel internal combustion engine 2. From said actual indicated average pressure and the target value for the indicated average pressure $PMI_{HD, target}$ a difference value is formed that is fed to the regulator 15. The regulator 15 then determines a difference value for the position of the centroid of heat release conversion rates $\alpha_{Q50, Des}$, which is fed, together with the position of the centroid of heat release conversion rates $\alpha_{Q50, Des}$ determined in process step 12, to process step 13 for determining the injection amounts of the individual fuel injections.

The explanation above of the embodiments describes in the present specification exclusively within the scope of examples. Of course, individual features of the embodiments can also, where technically appropriate, be free to combine with one another without departing from the scope of the present specification.

REFERENCE CHARACTER LIST

1 Exhaust system
2 Diesel internal combustion engine
3 Exhaust pipe
4 Turbine
5 Exhaust pipe
6 Oxidation catalytic converter
7 Particle filter
8 Exhaust pipe
9 NOx storage catalytic converter
10 Exhaust pipe
11 Process step for determining the injection amount of the total combusting fuel injection
12 Process step for determining the position of the centroid of heat release conversion rates
13 Process step for determining the injection amounts for the individual fuel injections
14 Regulator
15 Regulator
16 Electronic control unit
17 Air-fuel ratio sensor
18 Combustion chamber pressure sensor
$m_{oxygen}$ Amount of oxygen
$PMI_{HD,actual}$ Actual value for the indicated average pressure
$PMI_{HD,target}$ Target value for the indicated average pressure
$q_{total}$ Injection amount for the total combusting fuel injection
$q_{HE}$ Injection amount of the main injection
$q_{NE}$ Injection amount of the secondary injection
UB Ambient conditions
$A_{q50, Des}$ Centroid of heat release conversion rates
$\lambda_{actual}$ Actual value of the air-fuel ratio
$\lambda_{target}$ Target value of the air-fuel ratio
$\varphi_{HE}$ Start of the main injection
$\varphi_{NE}$ End of the main injection

The invention claimed is:

1. A method for adjusting the air-fuel ratio in the exhaust gas of a direct injection internal combustion engine, comprising:
dividing, by an electronic control unit, combusting fuel injection into a plurality of individual injections; and
predictively adjusting, by the electronic control unit, an air-fuel ratio in the exhaust gas of the internal combustion engine for a given load to a value that is necessary for regeneration of an NOx storage catalytic converter in the exhaust system of the internal combustion engine by adjusting a position of a centroid of heat release conversion rates and an injection amount of a total combusting fuel injection using at least one model.

2. The method according to claim 1, wherein the injection amount of the total combusting fuel injection and the number, the start and the end of the individual injections are adjusted to adjust the position of centroid of heat release conversion rates.

3. The method according to claim 1, wherein the combusting fuel injection is divided into a main injection and a post-injection.

4. The method according to claim 1, the injection amount of the total combusting fuel injection is calculated on the basis of a target value of the air-fuel ratio in the exhaust gas and a determined amount of oxygen in the induction air of the internal combustion engine.

5. The method according to claim 1, the position of the centroid of heat release conversion rates is determined using a model and based on a target value of the indicated average pressure and the injection amount of the total combusting fuel injection.

6. The method according to claim 1, wherein a necessary difference is determined from a predetermined target value of the indicated average pressure and a measured actual value of the indicated average pressure and a correction value for the position of the centroid of heat release conversion rates is determined from this by means of a higher level regulator.

7. The method according to claim 6, wherein a corrected target value for the centroid of heat release conversion rates is determined from the correction value for the centroid of heat release conversion rates and a target value for the centroid of heat release conversion rates.

8. The method according to claim 7, wherein a difference value for the centroid of heat release conversion rates is determined from the corrected target value for centroid of heat release conversion rates and an actual value for the centroid of heat release conversion rates and based on said difference value, positions of the individual injections and/or the distribution of the injection amounts of the total injection amount among the individual injections are regulated by a regulator.

9. The method according to claim 7, wherein the target value for the centroid of heat release conversion rates is determined based on a characteristic field.

10. The method according to claim 8, wherein the actual value for the centroid of heat release conversion rates is determined by a combustion model or from measured pressure profiles of the combustion chamber pressure.

11. The method according to claim 1, wherein an actual value of the air-fuel ratio in the exhaust gas of the internal combustion engine is measured by a sensor.

12. The method according to claim 1, wherein a necessary difference is determined from a target value of the air-fuel ratio in the exhaust gas and an actual value of the air-fuel ratio, and from this the injection amount of the total combusting fuel injection is regulated by a higher level regulator.

13. The method according to claim 1, a model for calculating the energy conversion and the combustion profile is used for adjusting the position of the centroid of heat release conversion rates.

14. The method according to claim 1, wherein positions of the individual predictively determined injections are adjusted by a higher level combustion position regulator.

15. A direct injection internal combustion engine system comprising:
   a direct injection internal combustion engine;
   an exhaust system;
   a NOx storage catalytic converter; and
   an electronic control unit configured to:
   divide combustion fuel injection into a plurality of individual injections,
   predictively adjust an air-fuel ratio in the exhaust gas of the internal combustion engine for a given load to a value that is necessary for regeneration of the NOx storage catalytic converter in the exhaust system of the internal combustion engine by adjusting a position of a centroid of heat release conversion rates and an injection amount of a total combusting fuel injection using at least one model.

16. The direct injection internal combustion engine system according to claim 15, wherein at least one combustion chamber pressure sensor for combustion position regulation is provided.

* * * * *